United States Patent [19]

Takayama

[11] Patent Number: 5,523,895
[45] Date of Patent: Jun. 4, 1996

[54] RECORDING AND/OR REPRODUCING APPARATUS

[75] Inventor: Nobutoshi Takayama, Yokohama, Japan

[73] Assignee: Canon Kabushiki Kaisha, Tokyo, Japan

[21] Appl. No.: 272,641

[22] Filed: Jul. 11, 1994

Related U.S. Application Data

[63] Continuation of Ser. No. 903,732, Jun. 24, 1992, abandoned.

[30] Foreign Application Priority Data

Jun. 25, 1991 [JP] Japan .................................. 3-153336

[51] Int. Cl.⁶ .......................... G11B 27/11; H04N 5/783
[52] U.S. Cl. ......................... 360/10.2; 360/10.3; 360/70; 360/74.2
[58] Field of Search ................... 360/74.1, 74.4, 360/74.5, 78.08, 73.14, 10.1, 10.2, 10.3, 74.2, 73.09, 70; 364/48

[56] References Cited

U.S. PATENT DOCUMENTS

| | | | |
|---|---|---|---|
| 4,562,493 | 12/1985 | Nishitani et al. | 360/74.1 |
| 4,581,659 | 4/1986 | Azuma et al. | 360/10.3 X |
| 4,723,180 | 2/1988 | Mitsuhashi et al. | 360/74.1 |
| 4,811,130 | 3/1989 | Takayama | 360/10.3 X |
| 4,963,999 | 10/1990 | Utsunomiya et al. | 360/72.3 |
| 4,999,721 | 3/1991 | Ogawa | 360/74.1 |

*Primary Examiner*—Aristotelis Psitos
*Assistant Examiner*—James L. Habermehl
*Attorney, Agent, or Firm*—Fitzpatrick, Cella, Harper & Scinto

[57] ABSTRACT

A recording/reproducing apparatus includes recording medium transporter. A counter counts a number of pulses corresponding to a distance moved by the recording medium in a first fixed period that includes the instant at which the recording medium starts to be fed and a second fixed period that includes the instant at which the recording medium stopping operation is actuated. The count result is utilized by a timing control to control either the timing with which the recording medium starts to be transported or the timing with which the recording medium is stopped. The recording medium is thereby set at a desired position with respect to a recording/reproducing device when it is being fed or is at rest.

19 Claims, 3 Drawing Sheets

1

RECORDING AND/OR REPRODUCING APPARATUS

This application is a continuation of application Ser. No. 07/903,732 filed Jun. 24, 1992, now abandoned.

BACKGROUND OF THE INVENTION

1. Field of the Invention

This invention relates to a recording and/or reproducing apparatus and, in particular, to a recording and/or reproducing apparatus which performs timing control when a recording medium starts feeding or is at rest.

2. Description of the Related Art

Tape-type recording mediums, such as magnetic tapes, are known as a means for recording and/or reproducing signals. Examples of a recording/reproducing apparatus using a magnetic tape include a VTR (video tape recorder) and a DAT (digital audio tape recorder). When changing, for example, in a VTR, from still to normal reproduction, or vice versa, it is necessary to stop or start a capstan motor of the video tape when the rotating head has attained a predetermined rotation phase. For example, when changing from normal to still reproduction, the capstan motor is stopped when the rotating head has attained a predetermined rotation phase, provided that the rotating head is in a satisfactory tracking condition with respect to the track of the video tape. When transition is made from still to normal reproduction, the capstan motor is started when the rotating head has attained a predetermined rotation phase, provided that the rotating head is tracing a fixed position of the track which is oblique to the path of the video tape.

A control system for detecting the rotation phase of the rotating head so as to stop or start the capstan motor in accordance with the detected result involves a time delay variation caused by the mechanical components thereof. To absorb such a variation, a phase adjusting means which consists, for example, of a volume control, is generally provided at an appropriate position.

However, apart from the above-mentioned time delay caused by the mechanical components, the tape starting/stopping characteristics will vary with changes in various environmental factors, such as the power voltage and the load of the capstan motor, and the tape tension. For example, the amount by which the tape overruns after the capstan is stopped, and the rotating-speed rise characteristic when the capstan is started, tend to vary due to environmental changes as mentioned above. Such variations may cause various problems. For example, the tracing position of the rotating head during still reproduction may be shifted from a desired position, or the rise characteristic in tracking may deteriorate when changing from still to normal reproduction.

FIG. 1 is a diagram showing changes in the starting characteristic of a capstan motor due to a variation in the power voltage thereof. It can be seen from this diagram that the time it takes the capstan motor to stabilize at a predetermined speed after starting depends on the power voltage.

SUMMARY OF THE INVENTION

It is an object of the present invention to solve the problems mentioned above.

Another object of this invention is to provide a recording and/or reproducing apparatus which enables the recording medium to be set in a desired position after it is started or stopped.

To achieve these objects, in accordance with an embodiment of the present invention, a recording/reproducing arrangement includes feeding a recording medium by a transporting unit capable of feeding the recording medium at a fixed speed and of stopping the recording medium. A signal is recorded/reproduced on or from the recording medium by a recording/reproducing unit and the number of pulses corresponding to the distance the recording medium moves is generated. The number of pulses generated in either a first fixed period that includes the instant at which the recording medium feed is started or a second fixed period that includes the instant at which the stopping of the recording medium is initiated. The timing of the feeding or stopping of the recording medium is controlled using the pulse count.

Other objects and features of the present invention will become apparent from the following detailed description of the preferred embodiments.

DETAILED DESCRIPTION OF THE PREFERRED EMBODIMENT

An embodiment of the present invention will now be described with reference to the accompanying drawings.

Figure 1:
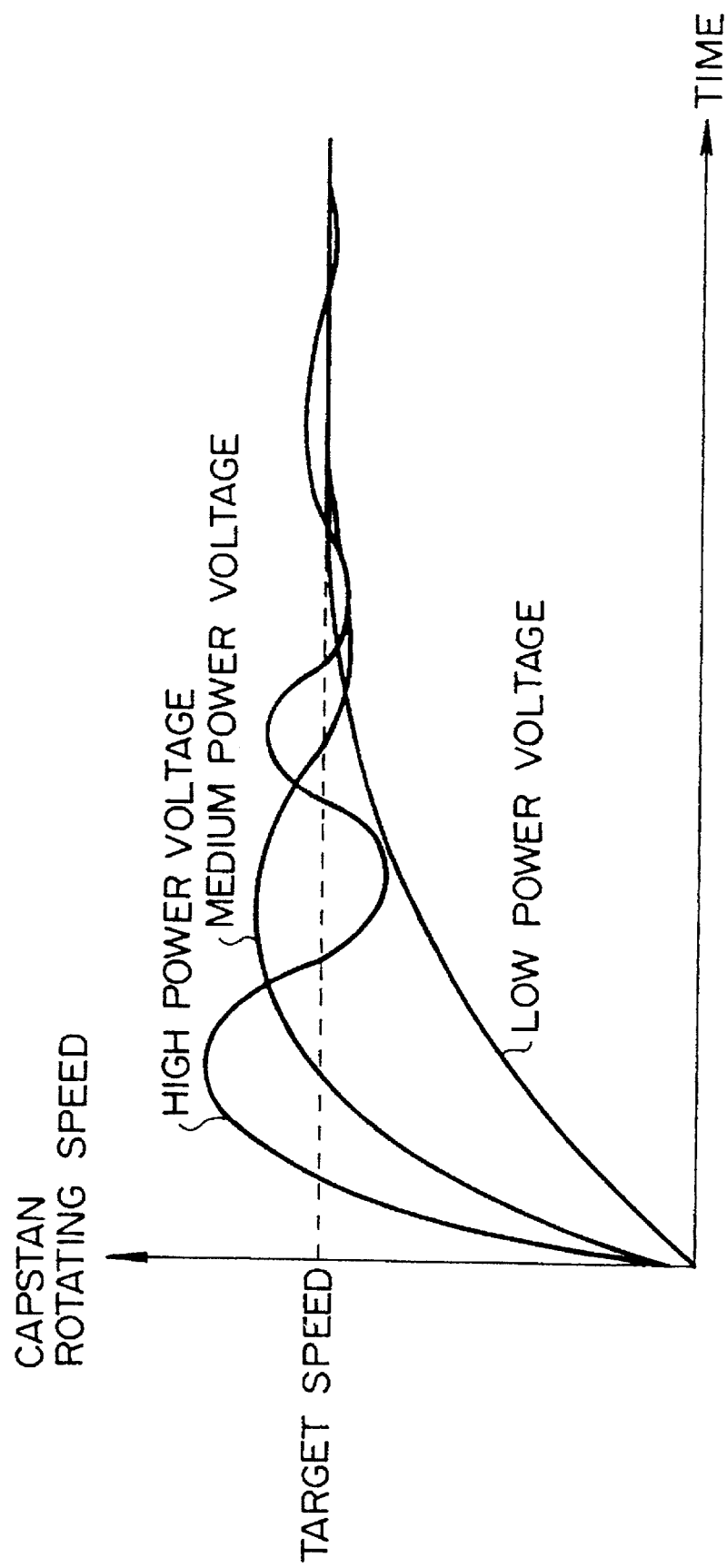
FIG. 1 is a diagram showing how the starting characteristic of a magnetic tape varies depending on the power voltage.
Figure 2:
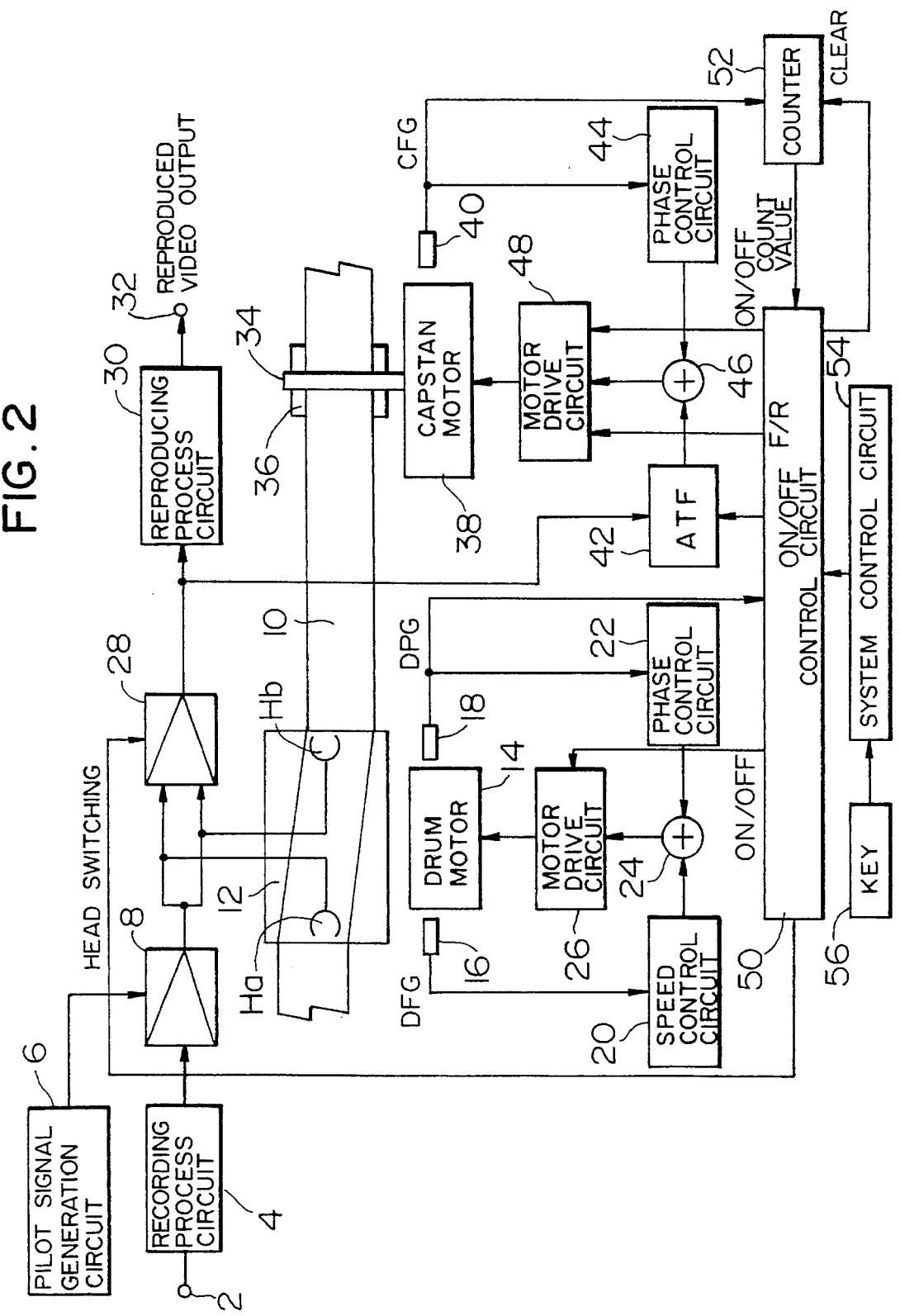
FIG. 2 is a block diagram of a VTR (video tape recorder) according to an embodiment of the present invention.

FIG. 2 is a diagram schematically showing the construction of a VTR according to an embodiment of the present invention. Numeral 2 indicates an input terminal for video signals; numeral 4 indicates a recording signal processing circuit for converting the video signals input through the terminal 2 into a form suitable for recording on a magnetic tape; numeral 6 indicates a circuit for generating pilot signals for tracking control; and numeral 8 indicates a recording amplifier for amplifying the pilot signals from the circuit 6 and the video signals processed by the recording signal processing circuit 4 and supplying them to a head Ha, Hb. Numeral 10 indicates a magnetic tape constituting the recording medium; numeral 12 indicates a rotating drum to which the rotating head Ha, Hb is attached; numeral 14 indicates a drum motor for rotating the rotating drum 12; numeral 16 indicates a rotation detecting circuit (more specifically, a frequency generating circuit) which detects the rotation of the drum motor 14 and emits a signal DFG having a frequency corresponding to the rotating speed thereof; and numeral 18 indicates a drum phase detecting circuit for outputting a pulse signal DPG indicative of the rotation phase of the rotating drum 12.

Numeral 20 indicates a speed control circuit for forming a rotating speed control signal from the rotating speed signal DFG output from the rotation detecting circuit 16 and outputting this control signal; and numeral 22 indicates a phase control circuit for forming a rotation phase control signal from the phase signal DPG output from the drum phase detecting circuit 18 and outputting this control signal. The speed control circuit 20 outputs, for example, a voltage signal corresponding to the difference between the present rotating speed and a target rotating speed, and the phase control circuit 22 outputs a voltage signal corresponding to the difference between the present phase and a target phase. Numeral 24 indicates an adder for adding the outputs of the speed control circuit 20 and the phase control circuit 22; and numeral 26 indicates a motor drive circuit for driving the drum motor 14 in accordance with the output of the adder 24.

Numeral 28 indicates a head amplifier for amplifying the output of the rotating head Ha, Hb attached to the rotating drum 12 and outputting the same as a unitary signal; numeral 30 indicates a reproducing process circuit for reproducing the output of the head amplifier 28 and outputting a reproduced video output signal; and numeral 32 indicates an output terminal for the reproduced video output signal.

Numeral 34 indicates a capstan for feeding the magnetic tape 10; numeral 36 indicates a pinch roller for holding the magnetic tape 10 together with the capstan 34; numeral 38 indicates a capstan motor for rotating the capstan 34; numeral 40 indicates a rotation detecting circuit (more specifically, a frequency generating circuit) which detects the rotating speed of the capstan motor 38 and outputs pulse signals CFG having a frequency proportional to the rotating speed of the capstan motor 38; numeral 42 indicates an auto tracking circuit (an ATF circuit) for generating a tracking error signal from the pilot signals contained in the reproduced RF output of the head amplifier 28; and numeral 44 indicates a speed control circuit for forming a control signal for rotating speed control in response to the rotating speed pulse signals CFG output from the rotation detecting circuit 40 and for outputting this control signal. The speed control circuit 44 outputs, for example, a voltage signal corresponding to the difference between the present rotating speed and a target rotating speed. Numeral 46 indicates an adder for adding the tracking error signal output from the ATF circuit 42 and the speed control signal output from the speed control circuit 44; and numeral 48 indicates a motor drive circuit for driving the capstan motor 38 in accordance with the output of the adder 46.

Numeral 50 indicates a control circuit for controlling the starting, stopping, rotating direction, rotating speed, etc. of the drum motor 14 and those of the capstan motor 38; and numeral 52 indicates a counter which counts the pulse signals CFG for a necessary period in accordance with an instruction from the control circuit 50. The control circuit 50 sequentially reads the count value of the counter 52 and stores the count value in an inner memory.

Numeral 54 indicates a system control circuit for controlling the entire apparatus. By using an operation key 56, the user inputs various instructions into the system control circuit 54.

The rotation control system for the drum motor 14 and that for the capstan motor 38 are ordinary ones as adopted in well-known VTRs, so a detailed description thereof will be omitted.

Figure 3:
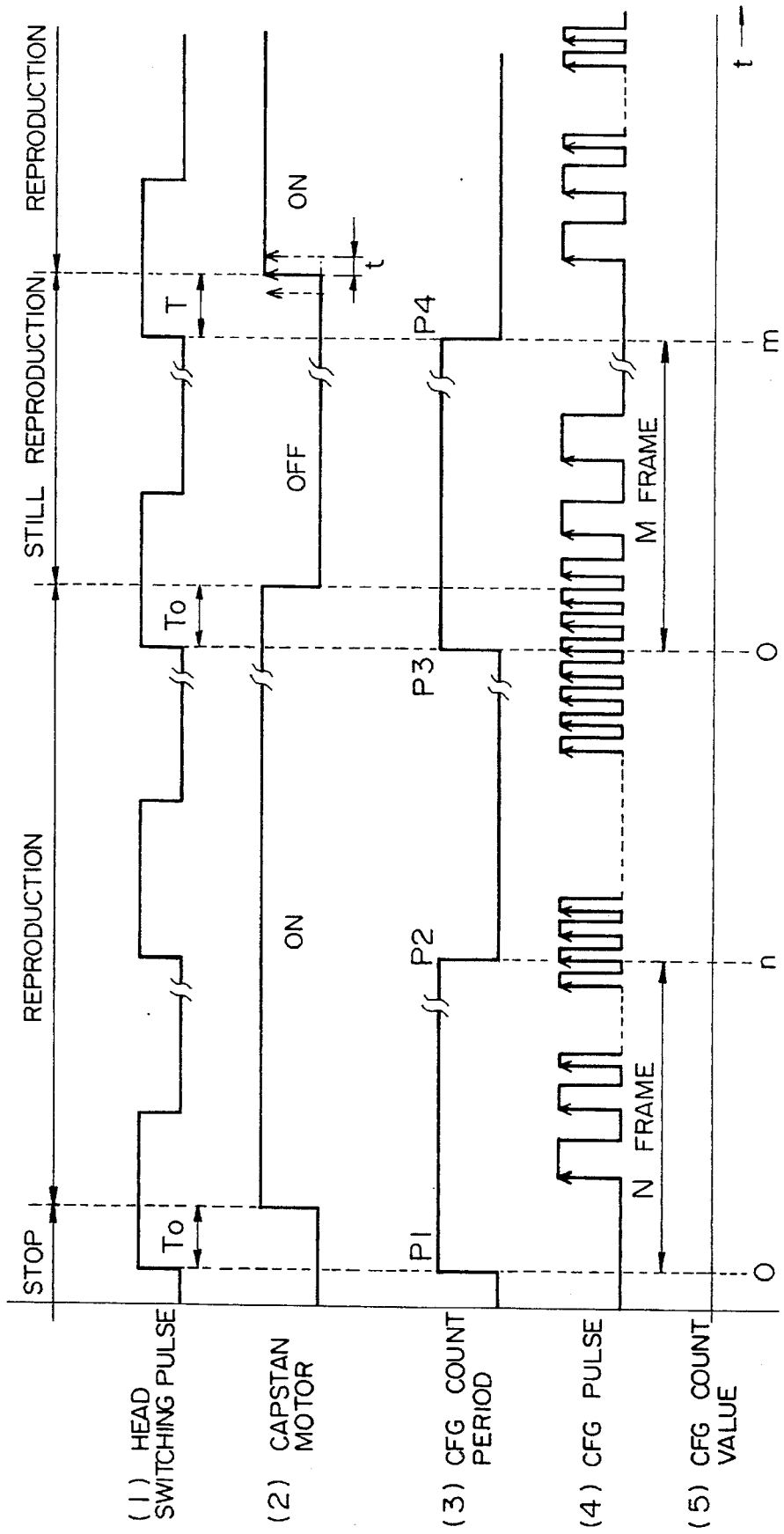
FIG. 3 is a timing chart showing waveforms in different sections of FIG. 2.

FIG. 3 is a chart illustrating the operational timing of the VTR of this embodiment when the operation mode is changed as: "stop"→"normal reproduction"→"still reproduction"→"normal reproduction". The operation of this embodiment when changing from still to normal reproduction will be described with reference to this drawing.

In the VTR of this embodiment, the counter 52 counts the CFG pulses during a predetermined period including the time at which the capstan motor 38 is started when changing from a state in which the tape is at rest (e.g., a still reproduction state) to the normal reproduction state. The period in which this counting is conducted is an N-frame period (N: positive integer) of the video signal which is set longer than the period needed for stabilizing the capstan motor 38 at a predetermined target rotating speed. Specifically, it is the period from point P1 to point P2 in FIG. 3, which is in synchronism with head switching pulses. It is assumed that the CFG pulse count number during this period is n.

Further, the count of CFG pulses by the counter 52 is also conducted when changing from normal reproduction to still reproduction and when the capstan motor 38 is stopped, the count being performed for a predetermined period including the instant at which the capstan motor 38 is stopped. The count period is an M-frame (M: positive integer) which is set longer than the period from point P3 to the instant at which the capstan motor 38 stops completely. It is assumed that the CFG pulse count of this period is m.

Assuming that the starting/stopping of the capstan is effected instantaneously, i.e., in an ideal manner, the following equation obviously holds true. Since mo should be 0, and no should be K·N, $$N=(no+mo)/K \qquad (1)$$

where K is the number of CFG pulses generated during one frame period in normal reproduction; "no" is the number of CFG pulses in the N-frame when the capstan is started; and "mo" is the number of CFG pulses in the M-frame when the capstan is at rest.

The following equation gives the correction time t of the capstan start timing when changing from still to normal reproduction:

$$t=\{(n+m)/K-N\}Tfr \qquad (2).$$

where Tfr is a time corresponding to one frame period. In this embodiment, the capstan drive timing when changing from still to normal reproduction is corrected as follows by using the value t of equation (2).

$$T=To+t \qquad (3)$$

where To is the delay time in capstan starting when changing from stop to normal reproduction and in capstan stopping when changing from normal reproduction to stop or still reproduction; and T is a delay time in capstan start timing with respect to the head switching pulse rising in this embodiment.

By thus correcting the capstan start timing, the tracking rise characteristic can be improved, thus making it possible to realize a satisfactory mode transition.

When repeating the normal and still reproductions, To in equation (3) may be replaced by the after-correction value at the time of capstan start directly before that, and correction may be effected sequentially. That is, assuming that the correction time directly before that is tp, $$t=\{(n+m)/K-N\}Tfr+tp \qquad (4)$$

Although in this embodiment the count of CFG pulses is conducted during periods before and after the stopping and starting of the capstan, it is also possible to conduct the count during only one of the periods which exhibits a larger variation, and substitute a fixed value for the other period.

Further, while in this embodiment the capstan start timing is corrected, it is also possible to correct the capstan stop timing on the basis of the same concept, thereby making it possible to stop the tape at a desired position and obtain a satisfactory still reproduction image. Likewise, the embodiment can be effectively applied to an intermittent capstan drive as in the case of frame feeding or slow reproduction.

The invention has been described with respect to a particular preferred embodiment thereof. It is to be understood, however, that various changes and modifications may be made by those skilled in the art without departing from the spirit and scope of the invention.

While the present invention has been described with reference to reproduction, it can also be utilized in recording, for example, in the capstan control when changing from recording pause mode to recording mode. In that case, a tracking control time is provided when changing from recording mode to recording pause mode, and the capstan is stopped beforehand with the same timing as in the still reproduction, thereby making a long tracking control process unnecessary or shorter. In addition, successive shots can be taken in a satisfactory manner.

As will be easily understood from the above description, it is possible, in accordance with the present invention, to quickly provide satisfactory tracking when starting the tape-type recording medium, and to stop the tape-type recording medium exactly at a desired position.

What is claimed:

1. A recording/reproducing apparatus comprising:
   (a) transporting means for transporting a recording medium;
   (b) recording/reproducing means for recording/reproducing a signal on the recording medium, said recording/reproducing means and the recording medium moving relatively and periodically;
   (c) generating means for generating a number of pulses corresponding to an amount of movement of the recording medium;
   (d) counting means for counting the number of pulses generated by said generating means at least in one of a first predetermined period including an instant at which said transporting means starts to transport the recording medium and a second predetermined period including an instant at which a recording-medium stopping operation is actuated,
   the first and second period being determined irrespective of movement of the recording medium,
   a counting result of said counting means of the first predetermined period indicating a starting characteristic of said transporting means and a counting result of said counting means of the second predetermined period indicating a stopping characteristic of said transporting means; and
   (e) timing control means for controlling at least one of a first timing to start transporting the recording medium and a second timing to initiate stopping the recording medium according to a counting result of said counting means,
   the first and second timings being determined relative to a signal which indicates the periodic moving of said recording/reproducing means and the recording medium.

2. An apparatus according to claim 1, wherein said recording medium is a tape-shaped recording medium and said recording/reproducing means includes a rotating head for scanning said tape-shaped recording medium obliquely with respect to a longitudinal direction thereof.

3. An apparatus according to claim 2, wherein said first predetermined period and said second predetermined period are n times longer than a period in which said rotating head traces the tape-shaped recording medium, n being a positive integer.

4. An apparatus according to claim 1, wherein said signal is a video signal and each of said first predetermined period and said second predetermined period is substantially n times longer than a period corresponding to one field of said video signal, n being a positive integer.

5. An apparatus according to claim 1, wherein said counting means outputs a count corresponding to the sum of the number of said pulses during said first predetermined period and the number of said pulses during said second predetermined period.

6. An apparatus according to claim 1, wherein said timing control means controls the timing with which said recording medium starts to be transported by said transporting means.

7. A recording/reproducing apparatus comprising:
   (a) transporting means for transporting a recording medium;
   (b) recording/reproducing means for recording/reproducing a signal on the recording medium, said recording/reproducing means and the recording medium moving relatively and periodically,
   said recording/reproducing means generating a periodic signal which indicates the periodic moving of said recording/reproducing means and the recording medium;
   (c) generating means which detects at least one of an operation characteristic at an instant when the recording medium starts to be transported by said transporting means and an operation characteristic at an instant when a recording-medium stopping operation is actuated and which generates numerical data related to a result of the detection; and
   (d) timing control means for controlling one of a first timing with which the recording medium starts to be transported by said transporting means and a second timing with which the recording medium is stopped according to the numerical data generated by said generating means,
   the first and second timings being determined relative to the periodic signal generated by said recording/reproducing means.

8. An apparatus according to claim 7, wherein said recording medium is a tape-shaped recording medium and said recording/reproducing means includes a rotating head which scans said tape-shaped recording medium obliquely with respect to a longitudinal direction thereof.

9. An apparatus according to claim 7, wherein said timing control means controls the timing with which said recording medium starts to be transported by said transporting means.

10. A recording/reproducing method comprising the steps of:

transporting a recording medium;
   recording/reproducing a signal on the recording medium by a recording/reproducing unit, said recording/reproducing unit and the recording medium moving relatively and periodically;
   generating a number of pulses corresponding to an amount of movement of the recording medium;
   counting the number of generated pulses in at least one of a first predetermined period including an instant at which said transporting step starts to transport the recording medium and a second predetermined period including an instant at which a recording-medium stopping operation is actuated,
   the first and second period being determined irrespective of movement of the recording medium,
   a counting result of said counting step of the first predetermined period indicating a starting characteristic of said transporting step and a counting result of said counting step of the second predetermined period indicating a stopping characteristic of said transporting step; and controlling at least one of a first timing to start feeding of the recording medium and a second timing to initiate stopping of the recording medium according to a result of the counting, the first and second timings being determined relative to a signal which indicates the periodic moving of said recording/reproducing unit and the recording medium.

11. A recording/reproducing apparatus, comprising:

(a) transporting means for transporting a recording medium on which a signal is recorded/reproduced by a recording/reproducing unit, said recording/reproducing unit and the recording medium moving relatively and periodically;

(b) counting means for counting a number of pulses generated at least in one of a first predetermined period including an instant at which said transporting means starts to transport the recording medium and a second predetermined period including an instant at which a recording-medium stopping operation is actuated, the first and second period being determined irrespective of movement of the recording medium, a counting result of said counting means of the first predetermined period indicating a starting characteristic of said transporting means and a counting result of said counting means of the second predetermined period indicating a stopping characteristic of said transporting means; and (c) control means for controlling at least one of a first timing to start the transporting of the recording medium by said transporting means and a second timing to initiate stopping the recording medium according to a counting result of said counting means;

the first and second timings being determined relative to a signal which indicates the periodic moving of said recording/reproducing means and the recording medium.

12. An apparatus according to claim 11, wherein said transporting means includes a generating circuit for generating a number of pulses corresponding to the amount of movement of the recording medium.

13. An apparatus according to claim 12, wherein said control means further includes a comparing circuit for comparing the counting result of said counting means and a predetermined number, and wherein said control means detects a change of amount of movement of the recording medium by using a comparing result of said comparing circuit.

14. An apparatus according to claim 12, wherein said control means controls said timing to start transporting the recording medium and said timing to initiate the recording medium stopping operation in accordance with a change per unit time detected by using the number of pulses in said first predetermined period and the number of pulses in said second predetermined period.

15. An apparatus according to claim 12, wherein said control means controls said timing to initiate the recording medium stopping operation in accordance with a change per unit time detected by using the number of pulses in said first predetermined period.

16. An apparatus according to claim 12, wherein said control means controls said timing to initiate the recording medium stopping operation in accordance with a change per unit time detected by using the number of pulses in said second predetermined period.

17. An apparatus according to claim 11, further comprising recording/reproducing means for recording/reproducing a signal on the recording medium.

18. An apparatus according to claim 11, wherein the recording medium includes a magnetic tape.

19. A recording/reproducing apparatus, comprising:

(a) transporting means for transporting a recording medium, said transporting means being capable of an intermittent transporting mode in which said transporting means transports the recording medium intermittently;

(b) recording/reproducing means for recording/reproducing a signal on the recording medium;

(c) generating means for generating a number of pulses corresponding to an amount of movement of the recording medium;

(d) counting means for counting the number of pulses generated by said generating means, said counting means counting the number of pulses, in said intermittent transporting mode, at least in one of a first predetermined period including an instant at which said transporting means starts to transport the recording medium and a second predetermined period including an instant at which a recording-medium stopping operation is actuated, the first and second period being determined irrespective of movement of the recording medium, a counting result of said counting means of the first predetermined period indicating a starting characteristic of said transporting means and a counting result of said counting means of the second predetermined period indicating a stopping characteristic of said transporting means; and (e) timing control means for controlling, in said intermittent transporting mode, at least one of a timing to start transporting the recording medium and a timing to initiate stopping the recording medium according to a counting result of said counting means.

\* \* \* \* \*

UNITED STATES PATENT AND TRADEMARK OFFICE
CERTIFICATE OF CORRECTION

PATENT NO. : 5,523,895

DATED : June 4, 1996

INVENTOR : NOBUTOSHI TAKAYAMA

It is certified that error appears in the above-identified patent and that said Letters Patent is hereby corrected as shown below:

COLUMN 1

Line 15, "mediums," should read --media,--.

COLUMN 5

Line 38, "period" should read --periods--.

COLUMN 6

Line 63, "period" should read --periods--.

COLUMN 7

Line 24, "period" should read --periods--.

UNITED STATES PATENT AND TRADEMARK OFFICE
CERTIFICATE OF CORRECTION

PATENT NO. : 5,523,895

DATED : June 4, 1996

INVENTOR : NOBUTOSHI TAKAYAMA

Page 2 of 2

It is certified that error appears in the above-identified patent and that said Letters Patent is hereby corrected as shown below:

COLUMN 8

Line 40, "period" should read --periods--.

Signed and Sealed this

Fifth Day of November, 1996

Attest:

BRUCE LEHMAN

Attesting Officer

Commissioner of Patents and Trademarks